United States Patent
Scavezze et al.

(10) Patent No.: US 9,443,354 B2
(45) Date of Patent: Sep. 13, 2016

(54) MIXED REALITY INTERACTIONS

(71) Applicant: MICROSOFT TECHNOLOGY LICENSING, LLC, Redmond, WA (US)

(72) Inventors: Michael Scavezze, Bellevue, WA (US); Jonathan Steed, Redmond, WA (US); Stephen Latta, Seattle, WA (US); Kevin Geisner, Mercer Island, WA (US); Daniel McCulloch, Kirkland, WA (US); Brian Mount, Seattle, WA (US); Ryan Hastings, Seattle, WA (US); Phillip Charles Heckinger, Woodinville, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 305 days.

(21) Appl. No.: 13/872,861

(22) Filed: Apr. 29, 2013

(65) Prior Publication Data
US 2014/0320389 A1    Oct. 30, 2014

(51) Int. Cl.
*G06F 3/01* (2006.01)
*G06T 19/00* (2011.01)

(52) U.S. Cl.
CPC ............. *G06T 19/006* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 6,429,954 B1 | 8/2002 | Kasai | |
| 7,190,496 B2 | 3/2007 | Klug et al. | |
| 7,936,489 B2 | 5/2011 | Brandt et al. | |
| 2006/0193502 A1* | 8/2006 | Yamaguchi | 382/118 |
| 2008/0100620 A1* | 5/2008 | Nagai | A63F 3/00643 345/424 |
| 2010/0194782 A1* | 8/2010 | Gyorfi et al. | 345/633 |

(Continued)

OTHER PUBLICATIONS

Samosky, Joseph T., et al. "BodyExplorerAR: enhancing a mannequin medical simulator with sensing and projective augmented reality for exploring dynamic anatomy and physiology." Proceedings of the Sixth International Conference on Tangible, Embedded and Embodied Interaction. ACM, 2012.*

ISA European Patent Office, International Search Report & Written Opinion for PCT/US2014/035765, WIPO, Aug. 14, 2014, 11 Pages.

(Continued)

*Primary Examiner* — Mark Zimmerman
*Assistant Examiner* — Vu Nguyen
(74) *Attorney, Agent, or Firm* — Dan Choi; Judy Yee; Micky Minhas

(57) ABSTRACT

Embodiments that relate to interacting with a physical object in a mixed reality environment via a head-mounted display are disclosed. In one embodiment a mixed reality interaction program identifies an object based on an image from captured by the display. An interaction context for the object is determined based on an aspect of the mixed reality environment. A profile for the physical object is queried to determine interaction modes for the object. A selected interaction mode is programmatically selected based on the interaction context. A user input directed at the object is received via the display and interpreted to correspond to a virtual action based on the selected interaction mode. The virtual action is executed with respect to a virtual object associated with the physical object to modify an appearance of the virtual object. The modified virtual object is then displayed via the display.

18 Claims, 6 Drawing Sheets

(56) References Cited

U.S. PATENT DOCUMENTS

| | | | |
|---|---|---|---|
| 2010/0253700 A1 | 10/2010 | Bergeron | |
| 2011/0075257 A1 | 3/2011 | Hua et al. | |
| 2011/0177845 A1* | 7/2011 | Fasold | 455/566 |
| 2011/0216060 A1* | 9/2011 | Weising et al. | 345/419 |
| 2012/0092328 A1 | 4/2012 | Flaks et al. | |
| 2012/0264510 A1 | 10/2012 | Wigdor et al. | |
| 2013/0044128 A1 | 2/2013 | Liu et al. | |
| 2013/0083062 A1 | 4/2013 | Geisner et al. | |
| 2013/0169680 A1* | 7/2013 | Chien et al. | 345/633 |
| 2013/0300766 A1* | 11/2013 | Mukawa | G02B 27/0172 345/633 |

OTHER PUBLICATIONS

Fogli et al., "Context-Aware Interaction in a Mobile Environment", In Human-Computer Interaction with Mobile Devices and Services, Jan. 1, 2003, pp. 434-439.

Starner, et al., "Augmented Reality through Wearable Computing", Retrieved at <<http://www.cc.gatech.edu/fac/Thad.Starner/p/journal/augmented-reality-through-wearable-computing.pdf>>, In Journal of Presence: Teleoperators and Virtual Environments, vol. 6, Issue 4, Aug. 1997, pp. 24.

European Patent Office, Office Action Issued in European Patent Application No. 14728032.5, Feb. 26, 2016, Netherlands, 6 pages.

* cited by examiner

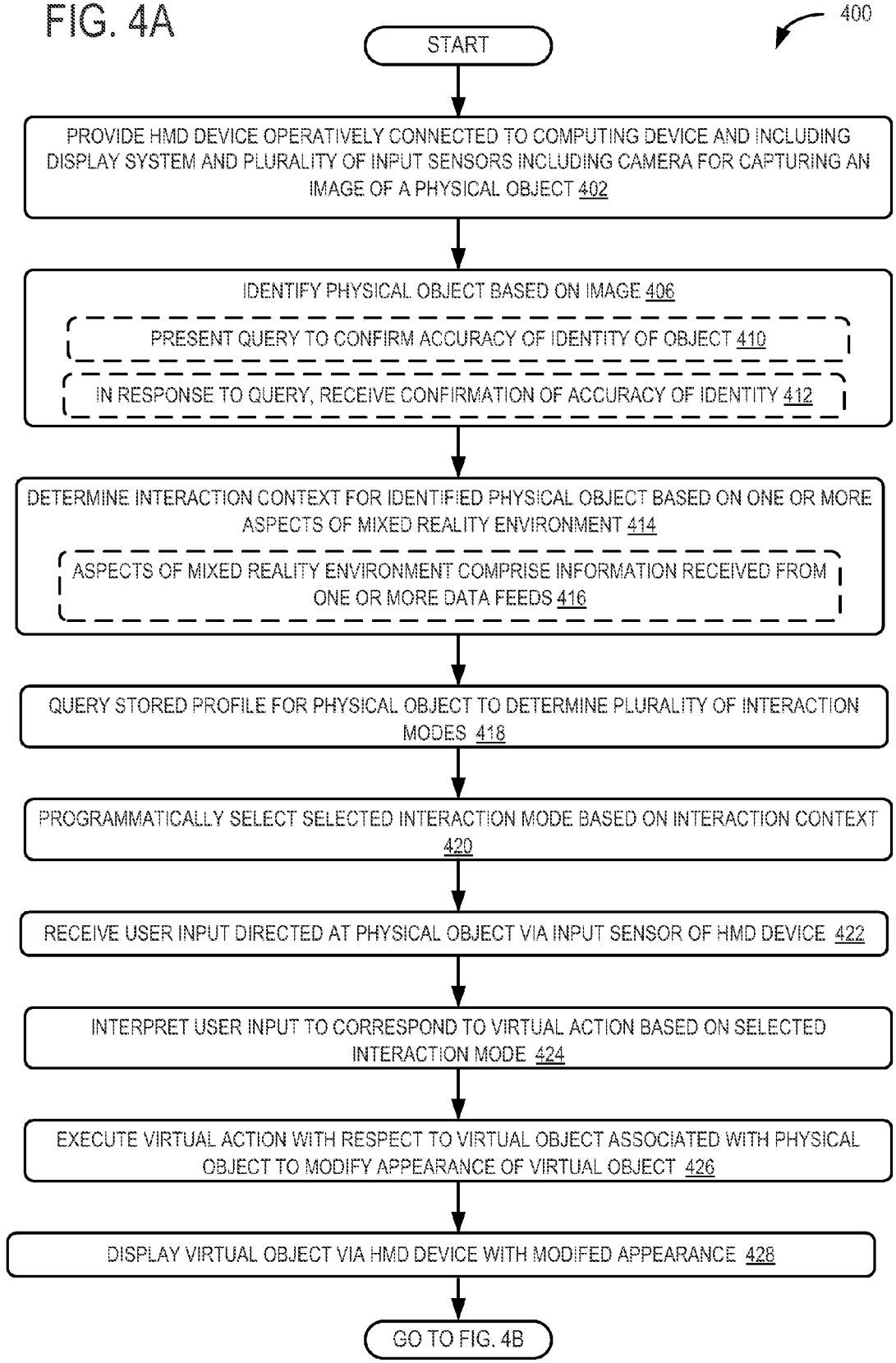

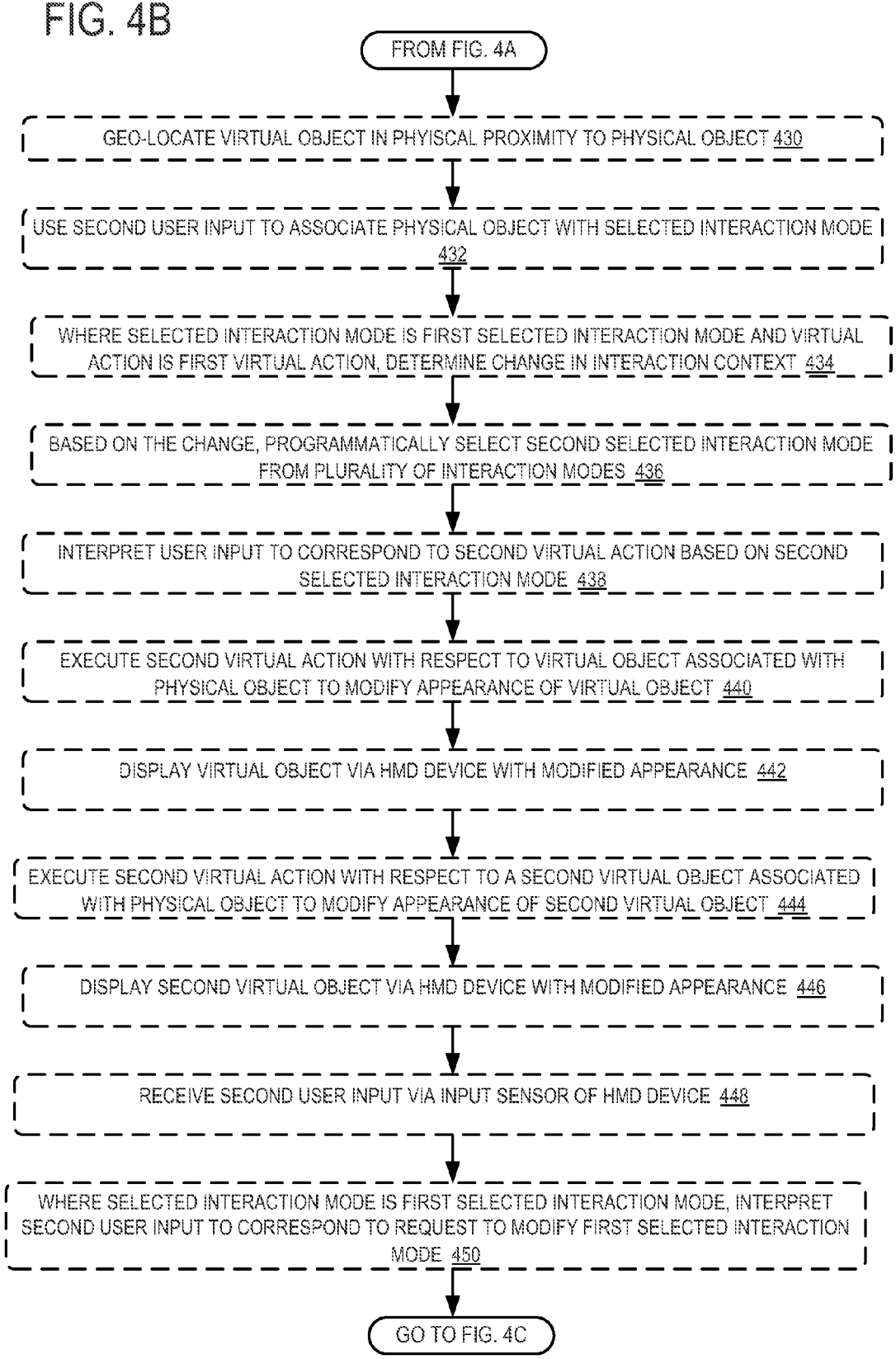

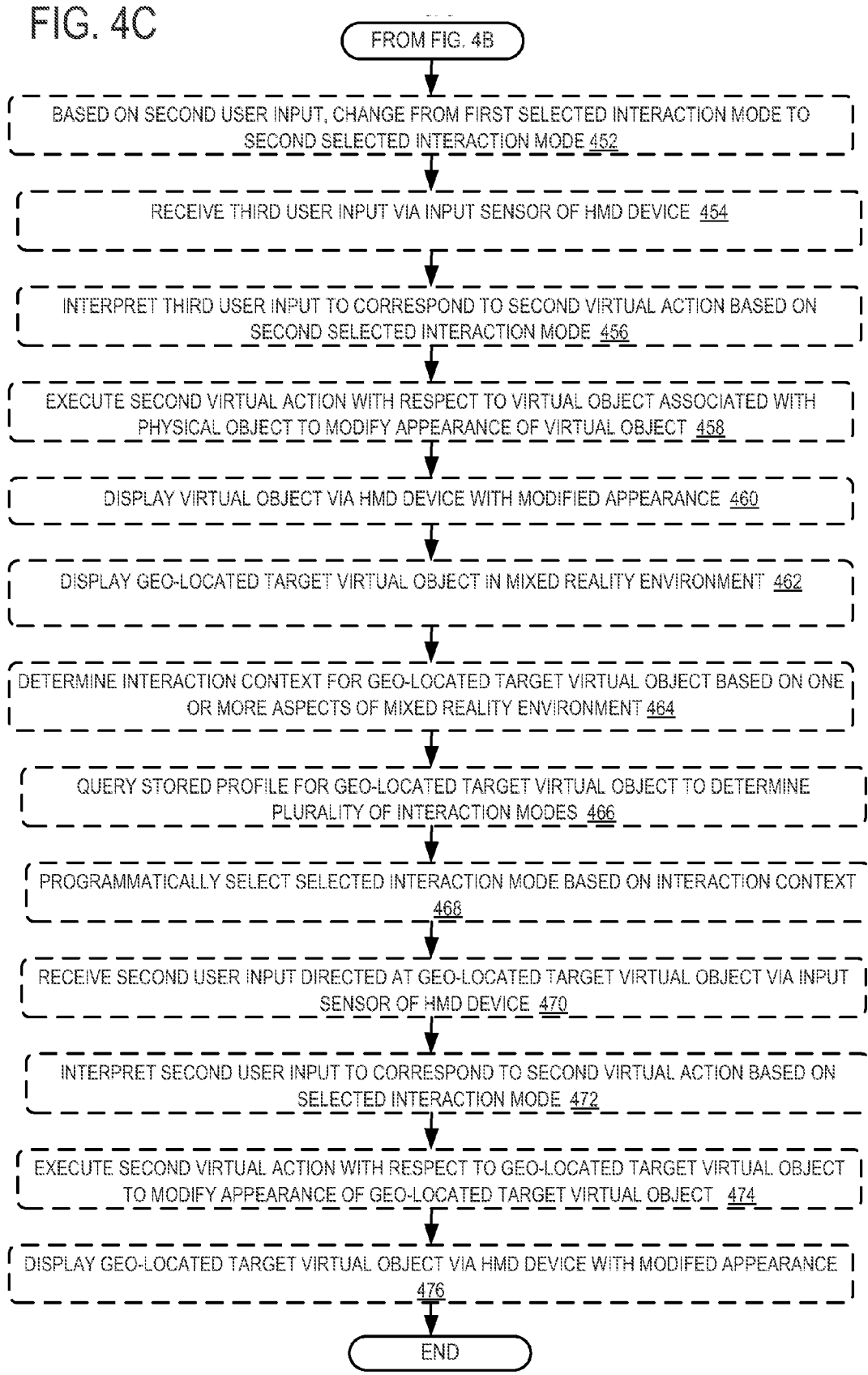

MIXED REALITY INTERACTIONS

BACKGROUND

Searching for and retrieving relevant information using computing devices is a common task. Typical computing devices that are used to find and display information may include smartphones, tablets, notebook computers, and the like. Such computing devices, however, are typically limited to connecting a user to relevant information via dedicated graphical user interfaces and corresponding display elements, such as web search portals, hyperlinks, etc. These well-known interfaces and display elements generated by a corresponding computing device are tied to the device, and generally embody little or no context linking them to the user or the user's environment. Further, typical computing devices are fairly limited in their capacity to understand an environment in which they are used and/or to link user activity within the environment to information relevant to the user.

SUMMARY

Various embodiments are disclosed herein that relate to systems and methods for interacting with a physical object in a mixed reality environment. For example, one disclosed embodiment provides a method for interacting with a physical object in a mixed reality environment. The method includes providing a head-mounted display device operatively connected to a computing device, with the head-mounted display device including a display system for presenting the mixed reality environment and a plurality of input sensors including a camera for capturing an image of the physical object. A physical object is identified based on the captured image, and an interaction context is determined for the identified physical object based on one or more aspects of the mixed reality environment.

The method includes querying a stored profile for the physical object to determine a plurality of interaction modes for the physical object. The method includes programmatically selecting a selected interaction mode from the plurality of interaction modes based on the interaction context. A user input directed at the physical object is received via one of the input sensors of the head-mounted display device. The user input is interpreted to correspond to a virtual action based on the selected interaction mode.

The method further includes executing the virtual action with respect to a virtual object that is associated with the physical object to thereby modify the virtual object's appearance. The method then displays the virtual object via the head-mounted display device with the modified appearance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A, 4B and 4C are a flow chart of a method for interacting with a physical object in a mixed reality environment according to an embodiment of the present disclosure.

DETAILED DESCRIPTION

Figure 1:
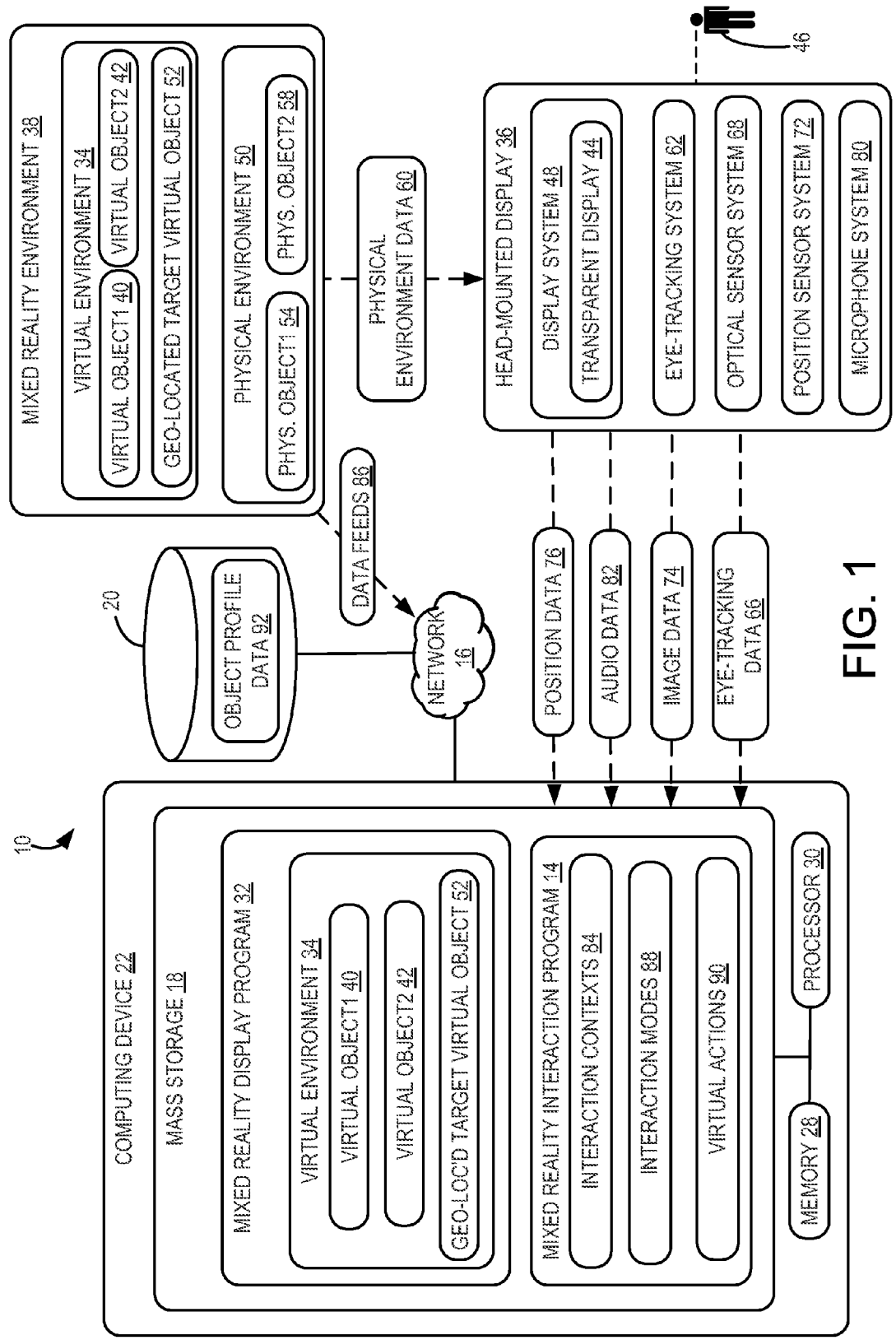
FIG. 1 is a schematic view of a mixed reality interaction system according to an embodiment of the present disclosure.

FIG. 1 shows a schematic view of one embodiment of a mixed reality interaction system 10. The mixed reality interaction system 10 includes a mixed reality interaction program 14 that may be stored in mass storage 18 of a computing device 22. The mixed reality interaction program 14 may be loaded into memory 28 and executed by a processor 30 of the computing device 22 to perform one or more of the methods and processes described in more detail below.

The mixed reality interaction system 10 includes a mixed reality display program 32 that may generate a virtual environment 34 for display via a display device, such as the head-mounted display (HMD) device 36, to create a mixed reality environment 38. As described in more detail below, the virtual environment 34 may include one or more virtual objects, such as virtual object1 40, virtual object2 42, and geo-located target virtual object 52. Such virtual objects may include one or more virtual images, such as three-dimensional holographic objects and other virtual objects, as well as two-dimensional virtual images, that are generated and displayed by HMD device 36.

The computing device 22 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of the computing device 22 are described in more detail below with reference to FIG. 5.

The computing device 22 may be operatively connected with the HMD device 36 using a wired connection, or may employ a wireless connection via WiFi, Bluetooth, or any other suitable wireless communication protocol. For example, the computing device 22 may be communicatively coupled to a network 16. The network 16 may take the form of a local area network (LAN), wide area network (WAN), wired network, wireless network, personal area network, or a combination thereof, and may include the Internet.

As described in more detail below, the computing device 22 may communicate with one or more other computing devices, such as server 20, via network 16. Additionally, the example illustrated in FIG. 1 shows the computing device 22 as a separate component from the HMD device 36. It will be appreciated that in other examples the computing device 22 may be integrated into the HMD device 36.

Figure 2:
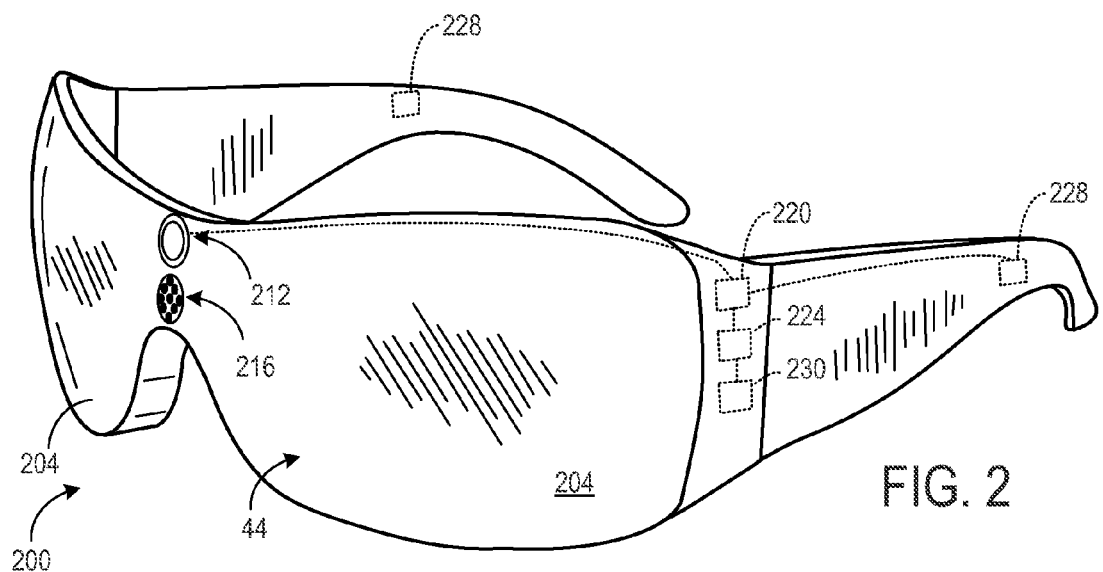
FIG. 2 shows an example head-mounted display device according to an embodiment of the present disclosure.

With reference now also to FIG. 2, one example of an HMD device 200 in the form of a pair of wearable glasses with a transparent display 44 is provided. It will be appreciated that in other examples, the HMD device 200 may take other suitable forms in which a transparent, semi-transparent or non-transparent display is supported in front of a viewer's eye or eyes. It will also be appreciated that the HMD device 36 shown in FIG. 1 may take the form of the HMD device 200, as described in more detail below, or any other suitable HMD device. Additionally, many other types and configurations of display devices having various form factors may also be used within the scope of the present disclosure. Such display devices may include hand-held smart phones, tablet computers, and other suitable display devices.

With reference to FIGS. 1 and 2, the HMD device 36 includes a display system 48 and transparent display 44 that enables images such as holographic objects to be delivered to the eyes of a user 46. The transparent display 44 may be configured to visually augment an appearance of a physical environment 50 to a user 46 viewing the physical environment through the transparent display. For example, the appearance of the physical environment 50 may be augmented by graphical content (e.g., one or more pixels each having a respective color and brightness) that is presented via the transparent display 44 to create a mixed reality environment.

The transparent display 44 may also be configured to enable a user to view a physical, real-world object, such as physical object1 54 and/or physical object2 58, in the physical environment 50 through one or more partially transparent pixels that are displaying a virtual object representation. As shown in FIG. 2, in one example the transparent display 44 may include image-producing elements located within lenses 204 (such as, for example, a see-through Organic Light-Emitting Diode (OLED) display). As another example, the transparent display 44 may include a light modulator on an edge of the lenses 204. In this example the lenses 204 may serve as a light guide for delivering light from the light modulator to the eyes of a user. Such a light guide may enable a user to perceive a 3D holographic image located within the physical environment 50 that the user is viewing, while also allowing the user to view physical objects in the physical environment, thus creating a mixed reality environment.

The HMD device 36 may also include various sensors and related systems. For example, the HMD device 36 may include an eye-tracking system 62 that utilizes at least one inward facing sensor 216. The inward facing sensor 216 may be an image sensor that is configured to acquire image data in the form of eye-tracking data 66 from a user's eyes. Provided the user has consented to the acquisition and use of this information, the eye-tracking system 62 may use this information to track a position and/or movement of the user's eyes.

In one example, the eye-tracking system 62 includes a gaze detection subsystem configured to detect a direction of gaze of each eye of a user. The gaze detection subsystem may be configured to determine gaze directions of each of a user's eyes in any suitable manner. For example, the gaze detection subsystem may comprise one or more light sources, such as infrared light sources, configured to cause a glint of light to reflect from the cornea of each eye of a user. One or more image sensors may then be configured to capture an image of the user's eyes.

Images of the glints and of the pupils as determined from image data gathered from the image sensors may be used to determine an optical axis of each eye. Using this information, the eye-tracking system 62 may then determine a direction and/or at what physical object or virtual object the user is gazing. Such eye-tracking data 66 may then be provided to the computing device 22. It will be understood that the gaze detection subsystem may have any suitable number and arrangement of light sources and image sensors.

The HMD device 36 may also include sensor systems that receive physical environment data 60 from the physical environment 50. For example, the HMD device 36 may include an optical sensor system 68 that utilizes at least one outward facing sensor 212, such as an optical sensor, to capture image data 74. Outward facing sensor 212 may detect movements within its field of view, such as gesture-based inputs or other movements performed by a user 46 or by a person or physical object within the field of view. Outward facing sensor 212 may also capture two-dimensional image information and depth information from physical environment 50 and physical objects within the environment. For example, outward facing sensor 212 may include a depth camera, a visible light camera, an infrared light camera, and/or a position tracking camera.

The HMD device 36 may include depth sensing via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. It will be appreciated that any other suitable depth camera may be used within the scope of the present disclosure.

Outward facing sensor 212 may capture images of the physical environment 50 in which a user 46 is situated. In one example, the mixed reality display program 32 may include a 3D modeling system that uses such input to generate a virtual environment 34 that models the physical environment 50 surrounding the user 46.

The HMD device 36 may also include a position sensor system 72 that utilizes one or more motion sensors 220 to capture position data 76, and thereby enable motion detection, position tracking and/or orientation sensing of the HMD device. For example, the position sensor system 72 may be utilized to determine a direction, velocity and acceleration of a user's head. The position sensor system 72 may also be utilized to determine a head pose orientation of a user's head. In one example, position sensor system 72 may comprise an inertial measurement unit configured as a six-axis or six-degree of freedom position sensor system. This example position sensor system may, for example, include three accelerometers and three gyroscopes to indicate or measure a change in location of the HMD device 36 within three-dimensional space along three orthogonal axes (e.g., x, y, z), and a change in an orientation of the HMD device about the three orthogonal axes (e.g., roll, pitch, yaw).

Position sensor system 72 may also support other suitable positioning techniques, such as GPS or other global navigation systems. Further, while specific examples of position sensor systems have been described, it will be appreciated that other suitable position sensor systems may be used. In some examples, motion sensors 220 may also be employed as user input devices, such that a user may interact with the HMD device 36 via gestures of the neck and head, or even of the body. The HMD device 36 may also include a microphone system 80 that includes one or more microphones 224 that capture audio data 82. In other examples, audio may be presented to the user via one or more speakers 228 on the HMD device 36.

The HMD device 36 may also include a processor 230 having a logic subsystem and a storage subsystem, as discussed in more detail below with respect to FIG. 5, that are in communication with the various sensors and systems of the HMD device. In one example, the storage subsystem may include instructions that are executable by the logic subsystem to receive signal inputs from the sensors and forward such inputs to computing device 22 (in unprocessed or processed form), and to present images to a user via the transparent display 44.

It will be appreciated that the HMD device 36 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the HMD device 36 may include additional and/or alternative sensors, cameras, microphones, input devices, output devices, etc. without departing from the scope of this disclosure. Further, the physical configuration of the HMD device 36 and its various sensors and subcomponents may take a variety of different forms without departing from the scope of this disclosure.

Figure 3:
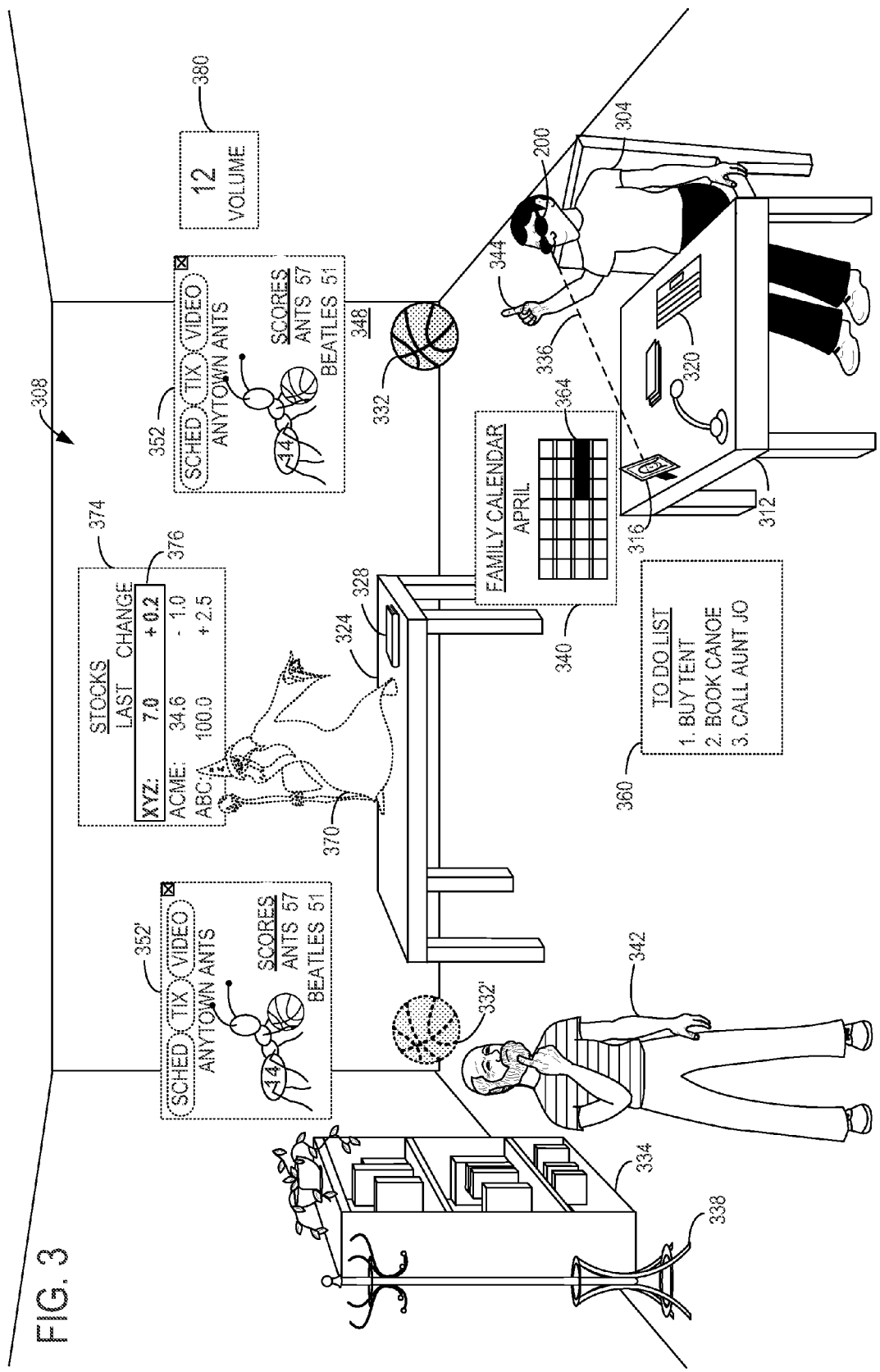
FIG. 3 is a schematic perspective view of a user wearing the head-mounted display device of FIG. 2 and using the mixed reality interaction system in an office according to an embodiment of the present disclosure.

With reference now to FIG. 3, descriptions of example use cases and embodiments of the mixed reality interaction system 10 will now be provided. FIG. 3 provides a schematic illustration of a user 304 located in a physical environment 50 that comprises an office 308, with the user experiencing a mixed reality environment 38 via an HMD device 36 in the form of HMD device 200. As discussed in more detail below, in FIG. 3 the mixed reality environment 38 may comprise the office 308 and one or more physical objects, as well as a virtual environment including one or more virtual objects.

In the example illustrated in FIG. 3, the user 304 sits at a desk 312 that includes a framed photograph 316 of the user's spouse and a keyboard 320. The optical sensor system 68 of the HMD device 200 may capture image data 74 from the office 308, including image data representing the photograph 316 and other physical objects in the office, such as table 324, book 328 on the table, basketball 332, bookcase 334 and coat rack 338. Image data 74 of one or more of these physical objects may be provided by the HMD device 200 to the mixed reality interaction program 14.

Using this image data 74, the mixed reality interaction program 14 may identify one or more of these physical objects. For example, the mixed reality interaction program 14 may identify the photograph 316 and the face of the user's spouse in the photograph by comparing image data 74 of the face to stored face image data and corresponding identities located on server 20. In this example, the mixed reality interaction program 14 may include a face detection subsystem that detects face images in the image data 74. To detect a face image in the image data 74, the face detection subsystem may use any suitable face detection technologies and/or algorithms including local binary patterns (LBP), principal component analysis (PCA), independent component analysis (ICA), evolutionary pursuit (EP), Elastic Bunch Graph Matching (EBGM), or other suitable algorithm or combination of algorithms.

The face detection program may access object profile data 92 on server 20 to match image data 74 including the face in photograph 316 with one or more images and related user profile information corresponding to user's spouse. It will be appreciated that the face detection program may use any suitable facial recognition techniques to match image data 74 with stored images of the user's spouse.

The mixed reality interaction program 14 also determines an interaction context 84 for the framed photograph 316 based on one or more aspects of the mixed reality environment 38. With reference again to FIG. 1, such aspects of the mixed reality environment 38 may include one or more data feeds 86 originating from the mixed reality environment 38 or externally to the mixed reality environment. Data feeds 86 may include temporal data, such as time of day, day of week, month, season, etc., social networking data, such as postings, status updates, etc. related to user 304, location data, weather data, etc.

In some examples and with reference to FIG. 3, such aspects of the mixed reality environment 38 may also include information more directly linked to the office 308. Such information may include the presence of one or more other persons in the office 308, the identities of such persons, an ambient light level, an ambient noise level, etc. In other examples, such aspects of the mixed reality environment 38 may also include information related to the user 304, such as user biometric parameters including, for example, heart rate, pupillary response, hemoglobin saturation, skin conductivity, respiration, perspiration, and brainwave activity.

In one example, the mixed reality interaction program determines that a current time of day is 10:30 am in the mixed reality environment 38. It will be appreciated that the time of day may be determined, for example, by an internal clock within computing device 22 or may be received from an external source via data feeds 86. Accordingly, in the present example the mixed reality interaction program 14 uses the current time of day of 10:30 am to determine a Business-Time interaction context for the photograph 316.

Having identified the face of the user's spouse in the photograph 316, the mixed reality interaction program 14 may then query a stored profile of the user's spouse in object profile data 92 to determine a plurality of interaction modes 88 that are available for the photograph 316. As described in more detail below, each of the plurality of interaction modes 88 may correspond to a different virtual action 90 that may be taken with respect to the photograph 316. In the present example, the available interaction modes 88 may include a Family Calendar interaction mode and a Family Reunion Planning interaction mode. In other examples, the mixed reality interaction program 14 may create a new profile for the photograph 316 that associates one or more interaction modes with the photograph. For example, the mixed reality interaction program 14 may enable the user 304 to create a new profile for the photograph 316 when, for example, a relationship status has changed.

Next, based on the determined interaction context, the mixed reality interaction program 14 may programmatically select a selected interaction mode. In the present example, with the determined interaction context being Business-Time, the mixed reality interaction program 14 programmatically selects a Family Calendar interaction mode. In one example, the Business-Time interaction context may be defined as a time of day falling between 8:00 am and 6:00 pm. The mixed reality interaction program 14 may be configured to pair the Business-Time interaction context with the Family Calendar interaction mode with respect to the photograph 316.

Another interaction context, a Personal-Time interaction context, may be defined as a time of day falling between 6:01 pm and 7:59 am. The mixed reality interaction program 14 may be configured to pair the Personal-Time interaction context with a Family Reunion Planning interaction mode with respect to the photograph 316.

In the present example, the mixed reality interaction program 14 may receive a user input from user 304 that is directed at the photograph 316. For example, the mixed reality interaction program 14 may receive eye-tracking data 66 from the HMD device 200 indicating that the user 304 is gazing at the photograph 316, as indicated by gaze line 336. In other examples, the user input may take one or more other forms including, for example, position data 76 and image data 74. The position data 76 may include head pose data indicating that the user 304 is facing the photograph 316. The image data 74 may include image data showing the user 304 pointing or gesturing at the photograph 316. It will be appreciated that other forms of user input may similarly be utilized.

The mixed reality interaction program 14 may then interpret the user 304 gazing at the photograph 316 to correspond to a virtual action 90. The virtual action 90 may be based on the selected interaction mode, in this example the Family Calendar interaction mode. The virtual action 90 may comprise presenting to the user 304 a virtual object in the form of the user's family calendar stored in a calendar application. It will be appreciated that the user's family calendar is associated with the photograph 316 of the user's spouse.

The mixed reality interaction program 14 may then execute the virtual action 90 with respect to a virtual instantiation of the user's family calendar to modify an appearance of the calendar. For example, to comfortably display the user's family calendar to the user 304, the mixed reality interaction program 14 may control the mixed reality display program 32 to scale the virtual instantiation of the calendar to a predetermined size. The mixed reality interaction program 14 may then display the virtual instantiation of the user's family calendar with the modified appearance, as indicated at 340, via the mixed reality display program 32 and HMD device 200.

In other examples, the mixed reality interaction program 14 may enable the user 304 to create and add new virtual actions 90 that are associated with the photograph 316. For example, the user 304 may create a virtual action that includes highlighting family members' birthdays on the family calendar. Thereafter, when the user 304 gazes at the photograph 316, the mixed reality interaction program 14 will highlight family members' birthdays on the displayed family calendar.

In one example, the mixed reality interaction program 14 may geo-locate the family calendar 340 in physical proximity to the photograph 316. As shown in FIG. 3, in the present example the calendar 340 may be displayed just above the photograph 316 such that when the user 304 gazes at the photograph, the calendar is presented in an easily viewable location just above the photograph. Being geo-located to the photograph 316, the calendar 340 may remain "tethered" to the photograph and may track the location of the photograph in the office 308. Advantageously, if the photograph 316 is moved to another location in the office 308, the user 304 may still easily recall and view the calendar 340 by gazing at the photograph 316.

In another example, the user 304 may use his right hand 344 to point at the basketball 332 near wall 348. The mixed reality interaction program 14 may identify the basketball, determine an interaction context for the basketball, query a stored profile for the basketball, and programmatically select a selected interaction mode based on the interaction context in a manner similar to that described above for the photograph 316. A camera in the HMD device 200 may capture image data 74 showing the user's right hand 344 pointing at the basketball 332. The mixed reality interaction program 14 may interpret this user input to correspond to displaying a website of the user's favorite basketball team.

The mixed reality interaction program 14 may then modify image data of the website to, for example, enhance the contrast of the displayed website when displayed above the basketball and in front of the wall 348. The mixed reality interaction program 14 may then display a holographic version of the modified website 352 above the basketball 332. The website 352 may also be geo-located to the basketball 332 such that it follows the basketball to different locations in the office 308, as indicated by basketball 332' and website 352' located near the left rear corner of the office.

In some examples, the mixed reality interaction program 14 may be unable to determine the identity of a physical object, or may determine an incomplete identity of the object. For example, the mixed reality interaction program 14 may not recognize a visitor 342 who enters the office 308. The mixed reality interaction program 14 may also determine that the user 304 currently has a meeting in the office 308 scheduled in the user's calendar with a John Doe. Based on this meeting, the mixed reality interaction program 14 may then query the user 304, "Is this John Doe?" via text displayed on the HMD device 200. The user 304 may provide a confirmation of the identity of the visitor 342 by, for example, nodding, speaking "Yes", or by any other suitable input.

In another example, where the user 304 does not confirm that the visitor 342 is John Doe, the mixed reality interaction program 14 may present another query to the user requesting the identity of the visitor. When the user 304 answers and provides an identity of the visitor, such as, "This is John Smith," the program may then associate the identity John Smith with the visitor. It will also be appreciated that such identity confirmation processes may be used with any other physical objects.

In another example, the mixed reality interaction program 14 may determine a change in the interaction context 84 and may correspondingly change the interaction mode 86. For example, the user 304 may be working in the office 308 late one night. At 7:01 pm the mixed reality interaction program 14 determines that the interaction context changes from Business-Time to Personal-Time. Accordingly, the mixed reality interaction program 14 may programmatically select the Family Reunion Planning interaction mode with respect to the photograph 316.

The mixed reality interaction program 14 may then interpret the user 304 gazing at the photograph 316 to correspond to a virtual action 90 that is based on the Family Reunion Planning interaction mode. In this example, the virtual action 90 may comprise highlighting the dates 364 of the user's family reunion gathering in the user's family calendar 340. The mixed reality interaction program 14 may then execute the virtual action with respect to the calendar 340 to modify an appearance of the calendar. For example, the mixed reality interaction program 14 may control the mixed reality display program 32 to highlight in flashing color the dates 364 of the family reunion gathering in the calendar 340. The mixed reality interaction program 14 may then render and display the calendar 340 with the highlighted dates 364 via the mixed reality display program 32.

In another example, after determining a change in the interaction context 84 to the Family Reunion Planning interaction mode, the mixed reality interaction program 14 may execute a different virtual action 90 with respect to a different virtual object that is associated with the photograph 316. For example, the mixed reality interaction program 14 may display a virtual family reunion To-Do List 360 via the mixed reality display program 32 and HMD device 200 to the user 304. As with the family calendar 340, the mixed reality interaction program 14 may control the mixed reality display program 32 to scale a virtual instantiation of the family reunion To-Do List 360 to a predetermined size. The mixed reality interaction program 14 may then display the To-Do List 360, via the mixed reality display program 32 with the modified appearance.

In another example, the user 304 may desire to manually switch between the Family Calendar interaction mode and the Family Reunion Planning interaction mode. The user may request that the current Family Calendar interaction mode be modified by, for example, speaking "Switch to Family Reunion Planning." The mixed reality interaction program 14 interprets this user input as a request to modify the interaction mode, and changes the interaction mode accordingly. The user may then point at the photograph 316, which is captured as image data 74 via the HMD device 200. The mixed reality interaction program 14 interprets this user input as corresponding to a virtual action 90 based on the Family Reunion Planning interaction mode, such as displaying the virtual family reunion To-Do List 360. The mixed reality interaction program 14 may then execute the virtual action and display the family reunion To-Do List 360 with a modified appearance as described above.

In another example, the mixed reality interaction program 14 may display a target virtual object that may function to enable user interaction with another virtual object in a manner similar to that described above. For example, the mixed reality interaction program 14 may display a geo-located target virtual object 52 in the form of a holographic wizard 370 located on table 324 in the mixed reality environment 38. The mixed reality interaction program 14 may then determine a Business-Time interaction context for the wizard 370 based on one or more aspects of the mixed reality environment 38.

The mixed reality interaction program may query a stored profile of the holographic wizard 370 in the object profile data 92 to determine a plurality of interaction modes 88 that are available for the wizard. In the present example, the available interaction modes 88 may include a Stock Market interaction mode and a Movie Listings interaction mode. Next, based on the determined interaction context, the mixed reality interaction program 14 may programmatically select a selected interaction mode. In the present example, with the determined interaction context being Business-Time, the mixed reality interaction program 14 programmatically selects the Stock Market interaction mode.

In the present example, the mixed reality interaction program 14 may receive a user input from user 304 that is directed at the holographic wizard 370, such as position data 76 including head pose data indicating that the user's face is oriented toward the wizard 370. The mixed reality interaction program 14 may then interpret the user 304 facing the wizard 370 to correspond to a virtual action 90 that is based on the selected interaction mode, in this example the Stock Market interaction mode, and is associated with the wizard 370. The virtual action 90 may comprise presenting a stock market summary 374 via the mixed reality display program 32 and HMD device 200 to the user 304.

The mixed reality interaction program 14 may then execute the virtual action 90 with respect to the stock market summary to, for example, highlight quotes of stocks owned by the user 304, such as the XYZ stock quote 376. The mixed reality interaction program 14 may control the mixed reality display program 32 to highlight the XYZ stock quote 376. The mixed reality interaction program 14 may then display the stock market summary 374 via the mixed reality display program 32.

In another example, the mixed reality interaction program 14 may also use a user input to create an association between a physical object and a selected interaction mode. With continued reference to FIG. 3, in one example the user 304 may desire to associate the basketball 332 with the Anytown Ants website 352. The user 304 may pick up the basketball 332 and rotate the basketball in the user's hands.

Using image data 74, the mixed reality interaction program 14 may recognize the user's rotation of the basketball 332 as a trigger to display to the user 304 the available interaction modes 88 for the basketball. Such interaction modes 88 may include, for example, displaying the Anytown Ants website, displaying a scoreboard of current basketball games, and displaying a calendar showing upcoming games in the user's basketball league. The user 304 may then select the Anytown Ants website interaction mode to associate with the basketball 332 via user input received by the HMD device 200. Accordingly, the mixed reality interaction program 14 may then be configured to associate the basketball 332 with the Anytown Ants website interaction mode. Subsequently, the mixed reality interaction program 14 may execute a virtual action with respect to the Anytown Ants website that is associated with the basketball 332 when user input directed at the basketball 332 is received, as described above.

It will be appreciated that the present system may enhance a user's ability to associate particular information sources, portals, etc. with objects in the mixed reality environment 38, whether physical objects or virtual objects. For example, by linking the holographic wizard 370 with a displayed stock market summary, the user may more easily remember to use the wizard to see the stock market summary during business hours. The user may, for example, memorize the phrase, "I'm a Wizard of the stock market" to provide an easily-remembered cognitive link between the holographic wizard 370 in the user's office 308 and the stock market summary.

In another example, the mixed reality interaction program 14 may generate audio feedback that is perceived by the user 304 as originating from a virtual object or physical object in the office 308. The mixed reality interaction program 14 may utilize a three-dimensional audio positioning technique, such as a head-related transfer function, to generate such audio feedback via speakers 228 of the HMD 200. In one example, the mixed reality interaction program 14 may generate audio comprising a broadcast of an Anytown Ants basketball game that is perceived by the user 304 as originating from the virtual website 352 or the basketball 332.

In another example, the mixed reality interaction program 14 may be configured to take a virtual action with respect to an object that is placed on the table 324. With reference to FIG. 3, the mixed reality interaction program 14 may recognize that book 328 is resting on the table 324. Accordingly, based on the book 328 resting on the table 324, the mixed reality interaction program 14 may programmatically post a status update to the user's social network that notes that the user 304 is currently reading book 328.

In another example, the mixed reality interaction program 14 may be configured to take a virtual action when a state of an object changes. For example, the mixed reality interaction program 14 may identify that the user 304 has begun drinking his regular cup of morning coffee at 6:30 am. The program may monitor the amount of coffee remaining in the user's cup. If a predetermined amount of coffee is remaining in the cup and the user attempts to check email, the program may prevent or dissuade the user from checking email. For example, upon detecting an attempt to check email, the program may display a message to the user asking, "Wouldn't you like to finish your relaxing cup of coffee first?"

In another example, a document related to a work project managed by the user 304 may be linked to the user, such as in the object profile data 92. A fellow team member of the work project may also wear an HMD device 200 that is communicatively coupled to a mixed reality interaction program 14. When the fellow team member sees the user 304, the team member's mixed reality interaction program 14 recognizes the user 304 and displays the document related to the work project via the team members' HMD device 200.

In another example, a team member may virtually deliver a document to the user 304 via leaving a physical or virtual object on the user's desk 312. For example, a team member of the user 304 may associate the document with a cardboard cutout of the letter "D." The team member may leave the cutout D on the user's desk 312 while the user 304 is away. Upon returning to the office 308, the user's HMD device 200 may recognize the cutout D. The HMD device 200 may indicate to the user 304 that the cutout D is actively linked to virtual information by, for example, animating the cutout D, such as by causing the cutout D to glow when viewed. The user 304 may request to view the linked virtual information, and the HMD device 200 may then access the document linked to the cutout D, and may display the document for the user 304.

In another example, the user 304 may provide a user input that applies to multiple virtual objects associated with multiple physical objects. For example and with reference to FIG. 3, the user 304 may desire to dim all of the virtual objects displayed in the office 308. The user 304 may extend his right hand 344 outwardly and lower his hand toward the desk 312. The mixed reality interaction system 10 may recognize this gesture, and may correspondingly dim all of the virtual objects displayed via HMD 200.

In another example, when the user 304 gazes at the basketball 332, the mixed reality interaction program 14 may interpret the user's gaze to correspond with displaying over the basketball a virtual volume control knob. The volume control knob may be virtually rotated by the user 304 to adjust the volume of the broadcast of the Anytown Ants basketball game to which the user is listening. The current volume may also be displayed as a digital volume indicator 380. In another example, the user 304 may pick up and physically rotate the basketball 332 to correspondingly adjust the volume of the broadcast via the virtual volume control knob.

In another example, while the user 304 is away from the office 308, the visitor 342 may pick up and rotate the basketball 332 to lower the volume of the basketball game broadcast that is being delivered by speakers in the room 308. When the user 304 returns to the office 308, the mixed reality interaction program 14 may identify the new orientation of the basketball 332 and correspondingly lower the volume of the broadcast being delivered to the user via HMD 200. The program may also correspondingly modify the volume indicator 380.

FIGS. 4A, 4B and 4C illustrate a flow chart of a method 400 for interacting with a physical object in a mixed reality environment according to an embodiment of the present disclosure. The following description of method 400 is provided with reference to the software and hardware components of the mixed reality interaction system 10 described above and shown in FIGS. 1 and 2. It will be appreciated that method 400 may also be performed in other contexts using other suitable hardware and software components.

With reference to FIG. 4A, at 402 the method 400 includes providing an HMD device operatively connected to a computing device. The HMD device includes a display system for presenting a mixed reality environment and a camera for capturing images of physical objects. At 406 the method 400 includes identifying a physical object based on a captured image. At 410 the method 400 may include presenting a query to the user to confirm an accuracy of an identity of the object. At 412 the method 400 may include, in response to the query, receiving confirmation of the accuracy of the identity of the object.

At 414 the method 400 includes determining an interaction context for the identified physical object based on one or more aspects of the mixed reality environment. At 416, the aspects of the mixed reality environment may comprise information received from one or more data feeds. At 418 the method 400 includes querying a stored profile for the physical object to determine a plurality of interaction modes for the object. At 420 the method 400 includes programmatically selecting a selected interaction mode from the plurality of interaction modes based on the interaction context. At 422 the method 400 includes receiving a user input directed at the physical object via one of the input sensors of the HMD device. At 424 the method 400 includes interpreting the user input to correspond to a virtual action based on the selected interaction mode.

At 426 the method 400 includes executing the virtual action with respect to a virtual object associated with the physical object to thereby modify an appearance of the virtual object. And at 428 the method 400 includes displaying the virtual object via the HMD device with the modified appearance. With reference now to FIG. 4B, at 430 and in some examples the method 400 includes geo-locating the virtual object in physical proximity to the physical object. At 432 the method 400 may include using a second user input to associate the physical object with a selected interaction mode.

In another example, at 434 the method 400 may include, where the selected interaction mode is a first selected interaction mode and the virtual action is a first virtual action, determining a change in the interaction context. At 436 the method 400 may include, based on the change, programmatically selecting a second selected interaction mode from a plurality of interaction mode. At 438 the method 400 may include interpreting user input to correspond to a second virtual action based on the second selected interaction mode. At 440 the method 400 may include executing the second virtual action with respect to the virtual object associated with the physical object to modify the appearance of the virtual object. And at 442 the method 400 may include displaying the virtual object via the HMD device with the modified appearance.

In another example, at 444 the method 400 may include executing a second virtual action with respect to a second virtual object that is associated with the physical object to modify the appearance of the second virtual object. At 446 the method 400 may include displaying the second virtual object via the HMD device with the modified appearance.

In another example, at 448 the method 400 may include receiving a second user input via an input sensor of the HMD device. At 450 the method 400 may include, where the selected interaction mode is a first selected interaction mode, interpreting the second user input to correspond to a request to modify the first selected interaction mode. With reference now to FIG. 4C, at 452 the method 400 includes, based on the second user input, changing from the first selected interaction mode to a second selected interaction mode. At 454 the method 400 may include receiving a third user input via the input sensor of the HMD device. At 456 the method 400 may include interpreting the third user input to correspond to a second virtual action based on the second selected interaction mode.

At 458 the method 400 may include executing the second virtual action with respect to the virtual object associated with the physical object to modify the appearance of the virtual object. At 460 the method may include displaying the virtual object via the HMD device with the modified appearance.

In another example, at 462 the method 400 may include displaying a geo-located target virtual object in the mixed reality environment. At 464 the method 400 may include determining an interaction context for the geo-located target virtual object based on one or more aspects of the mixed reality environment. At 466 the method may include querying a stored profile for the geo-located target virtual object to determine a plurality of interaction modes for the geo-located target virtual object. At 468 the method 400 may include programmatically selecting a selected interaction mode for the geo-located target virtual object based on the interaction context. At 470 the method 400 may include receiving a second user input directed at the geo-located target virtual object via an input sensor of the HMD device.

At 472 the method may include interpreting the second user input to correspond to a second virtual action based on the selected interaction mode. At 474 the method 400 may include executing the second virtual action with respect to the geo-located target virtual object to modify the appearance of the geo-located target virtual object. And at 476 the method 400 may include displaying the geo-located target virtual object via the HMD device with the modified appearance.

It will be appreciated that method 400 is provided by way of example and is not meant to be limiting. Therefore, it is to be understood that method 400 may include additional and/or alternative steps than those illustrated in FIGS. 4A, 4B AND 4C. Further, it is to be understood that method 400 may be performed in any suitable order. Further still, it is to be understood that one or more steps may be omitted from method 400 without departing from the scope of this disclosure.

Figure 5:
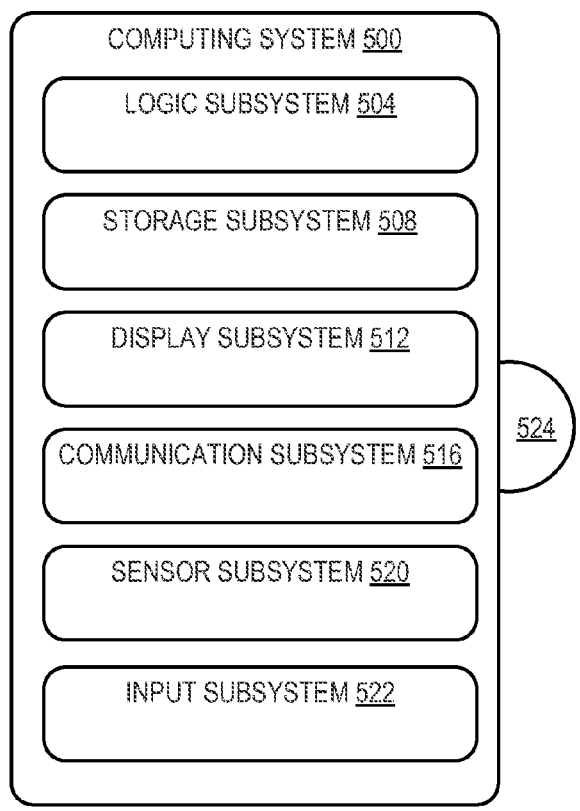
FIG. 5 is a simplified schematic illustration of an embodiment of a computing device.

FIG. 5 schematically shows a nonlimiting embodiment of a computing system 500 that may perform one or more of the above described methods and processes. Computing device 22 may take the form of computing system 500. Computing system 500 is shown in simplified form. It is to be understood that virtually any computer architecture may be used without departing from the scope of this disclosure. In different embodiments, computing system 500 may take the form of a mainframe computer, server computer, desktop computer, laptop computer, tablet computer, home entertainment computer, network computing device, mobile computing device, mobile communication device, gaming device, etc. As noted above, in some examples the computing system 500 may be integrated into an HMD device.

As shown in FIG. 5, computing system 500 includes a logic subsystem 504 and a storage subsystem 508. Computing system 500 may optionally include a display subsystem 512, a communication subsystem 516, a sensor subsystem 520, an input subsystem 522 and/or other subsystems and components not shown in FIG. 5. Computing system 500 may also include computer readable media, with the computer readable media including computer readable storage media and computer readable communication media. Computing system 500 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 504 may include one or more physical devices configured to execute one or more instructions. For example, the logic subsystem 504 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 504 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 508 may include one or more physical, persistent devices configured to hold data and/or instructions executable by the logic subsystem 504 to implement the herein described methods and processes. When such methods and processes are implemented, the state of storage subsystem 508 may be transformed (e.g., to hold different data).

Storage subsystem 508 may include removable media and/or built-in devices. Storage subsystem 508 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 508 may include devices with one or more of the following characteristics: volatile, nonvolatile, dynamic, static, read/write, read-only, random access, sequential access, location addressable, file addressable, and content addressable.

In some embodiments, aspects of logic subsystem 504 and storage subsystem 508 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), systemon-a-chip (SOC) systems, and complex programmable logic devices (CPLDs), for example.

FIG. 5 also shows an aspect of the storage subsystem 508 in the form of removable computer readable storage media 524, which may be used to store data and/or instructions executable to implement the methods and processes described herein. Removable computer-readable storage media 524 may take the form of CDs, DVDs, HD-DVDs, Blu-Ray Discs, EEPROMs, and/or floppy disks, among others.

It is to be appreciated that storage subsystem 508 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, display subsystem 512 may be used to present a visual representation of data held by storage subsystem 508. As the above described methods and processes change the data held by the storage subsystem 508, and thus transform the state of the storage subsystem, the state of the display subsystem 512 may likewise be transformed to visually represent changes in the underlying data. The display subsystem 512 may include one or more display devices utilizing virtually any type of technology. Such display devices may be combined with logic subsystem 504 and/or storage subsystem 508 in a shared enclosure, or such display devices may be peripheral display devices. The display subsystem 512 may include, for example, the display system 48 and transparent display 44 of the HMD device 36.

When included, communication subsystem 516 may be configured to communicatively couple computing system 500 with one or more networks and/or one or more other computing devices. Communication subsystem 516 may include wired and/or wireless communication devices compatible with one or more different communication protocols. As nonlimiting examples, the communication subsystem 516 may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

Sensor subsystem 520 may include one or more sensors configured to sense different physical phenomenon (e.g., visible light, infrared light, sound, acceleration, orientation, position, etc.) as described above. Sensor subsystem 520 may be configured to provide sensor data to logic subsystem 504, for example. As described above, such data may include eye-tracking information, image information, audio information, ambient lighting information, depth information, position information, motion information, user location information, and/or any other suitable sensor data that may be used to perform the methods and processes described above.

When included, input subsystem 522 may comprise or interface with one or more sensors or user-input devices such as a game controller, gesture input detection device, voice recognizer, inertial measurement unit, keyboard, mouse, or touch screen. In some embodiments, the input subsystem 522 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the mixed reality interaction system 10 that is implemented to perform one or more particular functions. In some cases, such a program may be instantiated via logic subsystem 504 executing instructions held by storage subsystem 508. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A mixed reality interaction system for interacting with a physical object in a mixed reality environment, the mixed reality interaction system comprising:
   a head-mounted display device operatively connected to a computing device, the head-mounted display device including an integrated display system for presenting the mixed reality environment and a plurality of integrated input sensors including a camera for capturing an image of the physical object; and
   a mixed reality interaction program executed by a processor of the computing device, the mixed reality interaction program configured to:
      identify the physical object based on the captured image;
      determine an interaction context for the identified physical object based on one or more aspects of the mixed reality environment;
      query a stored profile for the physical object to determine a plurality of interaction modes for the physical object;
      programmatically select a first selected interaction mode from the plurality of interaction modes based on the interaction context;
      receive a first user input directed at the physical object via one of the integrated input sensors of the head-mounted display device;
      interpret the first user input directed at the physical object to correspond to a first virtual action based on the selected interaction mode;

execute the first virtual action with respect to a virtual object associated with the physical object to thereby modify an appearance of the virtual object;

display the virtual object via the head-mounted display device with a first modified appearance;

receive a second user input via one of the plurality of integrated input sensors of the head-mounted display device;

based on the second user input, change from the first selected interaction mode to a second selected interaction mode from the plurality of interaction modes;

receive a third user input directed at the physical object via one of the plurality of integrated input sensors of the head-mounted display device;

interpret the third user input to correspond to a second virtual action based on the second selected interaction mode;

execute the second virtual action with respect to the virtual object associated with the physical object to thereby modify an appearance of the virtual object; and display the virtual object via the head-mounted display device with a second modified appearance.

2. The mixed reality interaction system of claim 1, wherein the mixed reality interaction program is further configured to:

present a first query to confirm an accuracy of an identity of the physical object; and in response to the query, either (1) receive a confirmation of the accuracy of the identity of the physical object or (2) where the confirmation of the accuracy of the identity is not received, present a second query requesting the identity of the physical object.

3. The mixed reality interaction system of claim 1, wherein the mixed reality interaction program is further configured to geo-locate the virtual object in physical proximity to the physical object.

4. The mixed reality interaction system of claim 1, wherein the mixed reality interaction program is further configured to:

determine a change in the interaction context;

based on the change in the interaction context, programmatically select the second selected interaction mode from the plurality of interaction modes;

interpret the first user input to correspond to the second virtual action based on the second selected interaction mode;

execute the second virtual action with respect to the virtual object associated with the physical object to thereby modify an appearance of the virtual object; and display the virtual object via the head-mounted display device with the second modified appearance.

5. The mixed reality interaction system of claim 4, wherein the virtual object is a first virtual object, and the mixed reality interaction program is further configured to:

execute the second virtual action with respect to a second virtual object associated with the physical object to thereby modify an appearance of the second virtual object; and display the second virtual object via the head-mounted display device with a modified appearance.

6. The mixed reality interaction system of claim 5, wherein the mixed reality interaction program is further configured to:

interpret the user input to correspond to a third virtual action applicable to the first virtual object and the second virtual object;

execute the third virtual action with respect to the first virtual object and the second virtual object to thereby modify the appearance of the first virtual object and the second virtual object; and display the first virtual object with a third modified appearance and the second virtual object with a different modified appearance via the head-mounted display device.

7. The mixed reality interaction system of claim 1, wherein the mixed reality interaction program is further configured to:

display a geo-located target virtual object in the mixed reality environment;

determine an interaction context for the geo-located target virtual object based on the one or more aspects of the mixed reality environment;

query a stored profile for the geo-located target virtual object to determine a plurality of interaction modes for the geo-located target virtual object;

programmatically select another selected interaction mode from the plurality of interaction modes for the geo-located target virtual object based on the interaction context;

receive another user input directed at the geo-located target virtual object via one of the integrated input sensors of the head-mounted display device;

interpret the other user input to correspond to another virtual action based on the first selected interaction mode for the geo-located target virtual object;

execute the other virtual action with respect to the geo-located target virtual object to thereby modify an appearance of the geo-located target virtual object; and display the geo-located target virtual object with a modified appearance.

8. The mixed reality interaction system of claim 1, wherein the mixed reality interaction program is further configured to create a new profile for the physical object that associates one or more interaction modes with the physical object.

9. The mixed reality interaction system of claim 1, wherein the mixed reality interaction program is further configured to:

identify an updated physical state of the physical object; and based on the updated physical state, further modify the appearance of the virtual object associated with the physical object.

10. A method for interacting with a physical object in a mixed reality environment, comprising:

providing a head-mounted display device operatively connected to a computing device, the head-mounted display device including an integrated display system for presenting the mixed reality environment and a plurality of integrated input sensors including a camera for capturing an image of the physical object;

identifying the physical object based on the captured image;

determining an interaction context for the identified physical object based on one or more aspects of the mixed reality environment;

querying a stored profile for the physical object to determine a plurality of interaction modes for the physical object;

programmatically selecting a first selected interaction mode from the plurality of interaction modes based on the interaction context;

receiving a first user input directed at the physical object via one of the integrated input sensors of the head-mounted display device;
interpreting the first user input directed at the physical object to correspond to a first virtual action based on the selected interaction mode;
executing the first virtual action with respect to a virtual object associated with the physical object to thereby modify an appearance of the virtual object;
displaying the virtual object via the head-mounted display device with a first modified appearance;
receiving a second user input via one of the plurality of integrated input sensors of the head-mounted display device;
based on the second user input, changing from the first selected interaction mode to a second selected interaction mode from the plurality of interaction modes;
receiving a third user input directed at the physical object via one of the plurality of input sensors of the head-mounted display device;
interpreting the third user input to correspond to a second virtual action based on the second selected interaction mode;
executing the second virtual action with respect to the virtual object associated with the physical object to thereby modify an appearance of the virtual object; and
displaying the virtual object via the head-mounted display device with a second modified appearance.

11. The method of claim 10, further comprising:
presenting a query to confirm an accuracy of an identity of the physical object; and
in response to the query, receiving a confirmation of the accuracy of the identity of the physical object.

12. The method of claim 10, further comprising geo-locating the virtual object in physical proximity to the physical object.

13. The method of claim 10, further comprising:
determining a change in the interaction context;
based on the change in the interaction context, programmatically selecting the second selected interaction mode from the plurality of interaction modes;
interpreting the first user input to correspond to the second virtual action based on the second selected interaction mode;
executing the second virtual action with respect to the virtual object associated with the physical object to thereby modify an appearance of the virtual object; and
displaying the virtual object via the head-mounted display device with the second modified appearance.

14. The method of claim 13, wherein the virtual object is a first virtual object, and the method further comprises:
executing the second virtual action with respect to a second virtual object associated with the physical object to thereby modify an appearance of the second virtual object; and
displaying the second virtual object via the head-mounted display device with a modified appearance.

15. The method of claim 10, further comprising:
displaying a geo-located target virtual object in the mixed reality environment;
determining an interaction context for the geo-located target virtual object based on the one or more aspects of the mixed reality environment;
querying a stored profile for the geo-located target virtual object to determine a plurality of interaction modes for the geo-located target virtual object;
programmatically selecting another selected interaction mode from the plurality of interaction modes for the geo-located target virtual object based on the interaction context;
receiving another user input directed at the geo-located target virtual object via one of the integrated input sensors of the head-mounted display device;
interpreting the other user input to correspond to another virtual action based on the first selected interaction mode for the geo-located target virtual object;
executing the other virtual action with respect to the geo-located target virtual object to thereby modify an appearance of the geo-located target virtual object; and
displaying the geo-located target virtual object with a modified appearance.

16. The method of claim 10, further comprises using another user input to associate the physical object with the first selected interaction mode.

17. A method for interacting with a physical object in a mixed reality environment, comprising:
providing a head-mounted display device operatively connected to a computing device, the head-mounted display device including an integrated display system for presenting the mixed reality environment and a plurality of integrated input sensors including a camera for capturing an image of the physical object;
identifying the physical object based on the captured image;
determining an interaction context for the identified physical object based on one or more aspects of the mixed reality environment;
querying a stored profile for the physical object to determine a plurality of interaction modes for the physical object;
programmatically selecting a first selected interaction mode from the plurality of interaction modes based on the interaction context;
receiving a first user input directed at the physical object via one of the integrated input sensors of the head-mounted display device;
interpreting the first user input directed at the physical object to correspond to a first virtual action based on the first selected interaction mode;
executing the first virtual action with respect to a virtual object associated with the physical object to thereby modify an appearance of the virtual object to a first modified appearance; and
displaying the virtual object via the head-mounted display device with the first modified appearance;
receiving a second user input via one of the plurality of integrated input sensors of the head-mounted display device;
based on the second user input, selecting a second selected interaction mode from the plurality of interaction modes;
receiving a third user input directed at the physical object via one of the integrated input sensors of the head-mounted display device;
interpreting the third user input directed at the physical object to correspond to a second virtual action based on the second selected interaction mode;
executing the second virtual action with respect to the virtual object associated with the physical object to thereby modify an appearance of the virtual object to a second modified appearance; and
displaying the virtual object via the head-mounted display device with the second modified appearance.

18. The method of claim 17, wherein the first user input and the second user input are each selected from the group consisting of eye-tracking input, voice input, gesture input, and head movement input.

* * * * *